Sept. 5, 1967 P. C. GOLDMARK ET AL 3,340,477

ELECTROSTATIC DATA RECORDING

Filed Dec. 19, 1961 2 Sheets-Sheet 1

INVENTORS
PETER C. GOLDMARK &
JOHN M. HOLLYWOOD

BY Brumbaugh, Free, Graves & Donohue their ATTORNEYS

Sept. 5, 1967 P. C. GOLDMARK ET AL 3,340,477

ELECTROSTATIC DATA RECORDING

Filed Dec. 19, 1961 2 Sheets-Sheet 2

INVENTORS
PETER C. GOLDMARK &
JOHN M. HOLLYWOOD
BY
Brumbaugh, Free, Graves & Donohue
their ATTORNEYS

United States Patent Office 3,340,477
Patented Sept. 5, 1967

3,340,477
ELECTROSTATIC DATA RECORDING

Peter C. Goldmark, Stamford, and John M. Hollywood, Greenwich, Conn., assignors to Columbia Broadcasting System, Inc., New York, N.Y., a corporation of New York Filed Dec. 19, 1961, Ser. No. 160,532
26 Claims. (Cl. 328—124)

This invention relates to data recording and, more particularly, to a data storage system capable of ultra-high storage density.

"Miniaturization" of certain electronic apparatus is becoming increasingly important. For example, where communications equipment is designed to be carried in aircraft or artificial earth satellites, it is essential to minimze its size and weight. Further, because of calculation-speed limitations imposed by the finite velocity of propagation of electrical impulses, the components of high-speed computers must be made as small as possible. Again, for reasons of economy in the storing of tapes or other devices containing recorded information, commercial video recording apparatus desirably includes high-density storage means.

Solid-state physicists have evolved a host of micro-electronic devices which facilitate "miniaturization" of many of the stages common to data transmission and processing systems. However, conventional data storage means such a magnetic tapes have thus far resisted efforts to compress more than about one-and-four-tenths million bits of information into a recording area one inch square. This storage density, while impressive when compared to the densities attainable a few years ago, is inadequate in some situations. The present invention utilizes electrostatic rather than conventional magnetic storage means and permits a storage density of some one hundred million bits per square inch.

Broadly, the invention comprises novel and highly effective means for forming an electrostatic image on a target adapted to store the image.

In one exemplary embodiment of the invention a target is provided having an insulating surface adapted to form an electrostatic image by secondary emission of electrons in response to bombardment by charged particles. The means for "writing" on the target is an electron gun which sweeps the target with an electron beam modulated, for example, by the output of a conventional photoelectric transducer such as an image orthicon. The target may subsequently be coated electrostatically with a powder having a secondary emission yield different from that of the target surface.

Readout is accomplished by again sweeping the target with an electron beam, in this case a beam of constant intensity, which may or may not be generated by the gun used to charge the target during the recording cycle. The secondary emission yield during the readout cycle is a function of the powder distribution and therefore of the output of the image orthicon.

A second exemplary embodiment of the invention is similar to the first but records by bombardment-induced conductivity instead of secondary emission.

In a third embodiment of the invention, recording is accomplished without an electron gun. A lens focuses an optical image on a photocathode which releases a number of electrons from any given point thereon in proportion to the intensity of the light incident at that point. The electrons so released are accelerated to strike the target, thereby forming an electrostatic image on the target by secondary emission, bombardment-induced conductivity, or any other means. A suitable device such as a mesh having a high secondary emission yield may be placed between the photocathode and the target in order to amplify the signal. While this embodiment of the invention requires no electron gun for the recording operation, an electron gun may be employed to accomplish readout.

In any of the embodiments of the invention, the recording may be by AM, FM, or a combination of the two, and the secondary emission yield of the coating may be either higher or lower than that of the target surface on which it is deposited. Further, the target may be rotated or otherwise moved in order to facilitate recording on successive portions thereof.

For an understanding of further aspects of the invention, reference may be had to the following detailed description of several exemplary embodiments thereof and to the accompanying figures in the drawings, of which:

Figures 1, 2, 3:
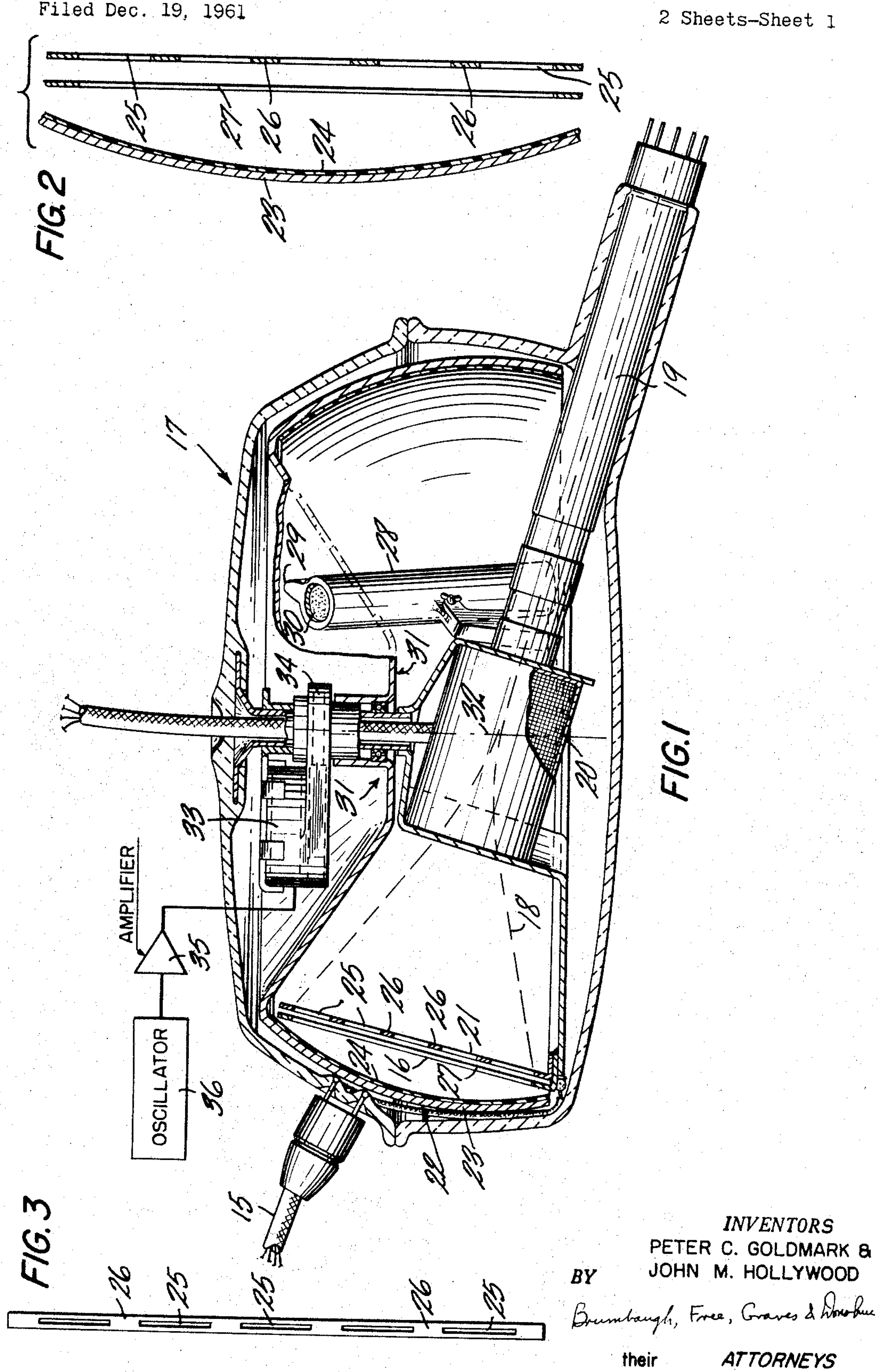
FIGURE 1 is a side elevational view, partly in section, of a vacuum tube constructed in accordance with the invention.
FIGURE 2 is an enlarged side elevational view of a portion of the tube of FIG. 1, showing in greater detail a focusing electrode and a collector electrode constructed in accordance with the invention.
FIGURE 3 is an end elevational view of the focusing electrode of FIG. 2.

The tube shown in FIG. 1 may be used, for example, in combination with a conventional photoelectric transducer such as an image orthicon (not shown). An image orthicon typically has a lens adapted to focus a real optical image on a photocathode which releases a number of electrons at any given point thereon proportionate to the intensity of the light incident at that point. The electrons so released are accelerated to form a transient electron image on a target, and a scanning beam scans the target to produce a succession of electrical impulses having a time pattern representative of the space pattern of the optical image.

A lead 15 adapted to transmit electrical impulses produced in the manner described above is connected to an electrode 16 so that the potential of the electrode 16 varies in accordance with the visual information. The electrode 16 forms part of a tube 17 constructed in accordance with the invention and is adapted to modulate an electron beam 18 generated by an electron gun 19 mounted within the tube.

In a manner well known in the art, deflection coils 20 cause the beam 18 to sweep back and forth in a plane at a scan rate of, say, 600 cycles per second, and the beam is activated while it sweeps in one direction but blanked during the return sweep.

A focusing electrode 21 is biased positively with respect to a target 22 and lies in the path of the beam 18 between the beam source and the electrode 16. The target 22, which is bombarded by the electrons in the beam, has an electrically-conductive back portion 23 and, facing the beam 18, an electrically-insulating front portion 24 adapted to emit secondary electrons in response to electron bombardment. The front portion 24 may advantageously be comprised of zinc orthosilicate ($Zn_2SiO_4$). See also FIGS. 2 and 3, which show the construction of the electrodes 16 and 21 and the target 22 in greater detail.

The plane in which the electron beam 18 sweeps is normal to the planes of the electrodes 16 and 21. A plurality of longitudinally-aligned narrow slots 25 in the focusing electrode 21 serve as apertures through which the beam 18 passes and focus the beam to a fine spot. A plurality of spaced-apart ribs 26 separating the slots 25 intercept the beam 18 at intervals to provide whatever blanking may be desired during the active sweep of the beam. The ribs also serve the purpose of strengthening the electrode 21 in embodiments of the tube in which the electrode has a long thin construction.

Uniform focusing of the spot over the entire target width is further facilitated by a slight concavity of the target surface towards the electron beam 18. The radius of curvature of the surface of the target 22 in the plane in which the beam 18 sweeps may advantageously be chosen so that points of a line on the surface of the target 22 in that plane are equidistant from the center of beam deflection. Selection of a sufficiently great filament-to-target distance also facilitates proper focusing.

The electrode 16, which is biased positively with respect to the focusing electrode 21, and therefore also with respect to the target 22, is provided with a slot 27 which is somewhat wider in a direction perpendicular to the plane of the sweep of the electron beam 18 than the slots 25 are. Like the slots 25, the slot 27 serves as an aperture through which the electrons in the beam 18 pass during their fall to the target 22.

During the recording cycle, the electrons in the beam 18 fall through a potential difference which may be in the neighborhood of 10 to 30 kilovolts from the gun 19 to the target 22. In a specific case, the potential difference may be, say 12 kilovolts; however, the exact amount of energy imparted to the electrons during their fall depends upon the instantaneous voltage of the electrode 16, which therefore serves to modulate the beam 18. The energy of the electrons and the charge density on the target 22 left in the wake of the beam 18 as a result of secondary emission from the front portion 24 of the target 22 are thus functions of the electrical impulses in the lead 15. It will be understood by those skilled in the art that an electron image is therefore formed on the front portion 24 of the target 22.

FIG. 1 further shows a stationary tray 28 having an elongated opening 29 and containing a powder 30. The tray 28 is mounted near the target 22 by any convenient means, the opening 29 being adjacent to the target 22. The secondary emission yield of the powder 30 differs from that of the target 22 and, in one embodiment of the invention, is at least twice that of the front portion 24. One substance suitable for use in accordance with the invention is powdered magnesium oxide (MgO).

While the tray 28 is shown in a more-or-less vertical position in FIG. 1, the tube 17 can be so oriented as to bring the tray 28 into a horizontal position. Alternatively, especially in an artificial earth satellite, the entire satellite can be rotated by means, for example, of small rockets about an axis of the satellite external to the tube 17 and parallel to and in front of the elongated opening 29 of the tray 28. Thus, the powder 30 readily can be made to distribute itself uniformly throughout the length of the tray 28.

During the recording cycle, the rotation of the target 22 in a manner hereinafter explained brings the parts thereof upon which an electron image has been formed successively into proximity with the powder 30. The powder 30 is preferably electrostatically attracted to the various parts of the charged front portion 24 of the target 22 in amounts dependent upon the respective densities of the charge on those parts. Thus, the target 22 need not be immersed in the powder 30.

The powder 30 may have a color making it visible against the target background, and, if the recording is by AM, visual editing of the recorded information is possible. If the recording is by FM, an AM auxiliary side track or overlay can be used to facilitate visual editing.

During the readout cycle, the electron gun 19 generates a readout beam which sweeps the target 22 in the manner previously set forth, except that the readout beam is of constant intensity. That is, it is not modulated in accordance with the output of the image orthicon, the electrode 16 being kept at a constant potential. The readout beam retraces each line drawn by the recording beam. Inasmuch as the areas of the front portion 24 of the target 22 which have been densely covered with the powder 30 have secondary emission yields different from those of the areas which have been sparsely covered, the intensity of the secondary emission from any given point of the front portion 24 is a function of the density of the powder 30 at that point and therefore of the charge left in the wake of the recording beam. This is true regardless of whether the front portion 24 or the powder 30 has the higher secondary emission yield. It is desirable that the difference between the yields be substantial, but any detectable difference is sufficient.

The secondary electrons emitted during the readout cycle are collected by the collector electrode 16. The target 22 and the electrode 16 function as a multiude of diodes having their cathodes on the front portion 24 of the target 22 and their anodes on the electrode 16. The potential difference between the electrode 16 and the target 22 is so little that the currents set up by the secondary electrons released by the readout beam behave as they do in diodes operating within the range where their characteristics are "linear."

The resulting modulated current in the electrode 16 may be employed in a conventional manner. For example, the modulated current may be used to control the output of a transmitter which broadcasts to a remote receiving station, using a bandwidth of, say, 24 megacycles per second.

Xerographic reproduction is an alternate method of obtaining the information stored on the target 22.

In accordance with the invention, means are provided for recording a plurality of lines in side-by-side relation even though successive sweeps of the electron beam are confined to one plane. The target 22 may conveniently be frustum shaped, supported by center portions 31 and symmetrical about an axis of rotation 32. Because the drum may have little mass and turn at low speed and may be mounted on low-friction vacuum bearings, the driving power required to rotate the target 22 about the axis 32 may be but a fraction of a watt.

Thus, FIG. 1 shows a small synchronous clock motor 33 for driving the target 22 through a worm-drive reduction gear 34. In a manner well known in the art, the motor 33 may be powered by an amplifier 35 with frequency and phase controlled by a 600-cycle-per-second reference signal derived from an oscillator 36 during the readout cycle. The signal is located in pulse form on a portion of a blanking pedestal at the end of each line scanned on the target 22. As a result, the relationship between the rotational speed and the phasing of the target 22 and the electron beam scanning is such that the writing beam and the readout beam always track along the same lines.

At the end of a certain period of time, for example, 6.5 minutes, the entire recording area of the target 22 will have been written on by the beam 18. The beam 18 is then deactivated and the clock motor 33 brings the target 22 to a halt. Readout is effected at any convenient time. The target is susceptible of reuse by merely wiping off the powder 30 and neutralizing the charge on the target surface by either grounding the surface to a conductor, preferably nonabrasive, or flooding the surface with an electron beam to bring the surface to a uniform potential.

The target 22 may advantageously have a width of 4.75 inches, of which 4.33 inches is devoted to video information, 0.21 inch to auxiliary data, and 0.21 inch to margin, and a diameter of 8.8 inches. Then, if the angular speed of the target 22 about the axis 32 is one rotation per 6.5 minutes, the scan frequency is 600 cycles per second, the available bandwidth is 24 megacycles per second, and the focusing electrode is adapted to define a spot 1.5 microns in diameter, 73,300 television elements can be recorded in a single line, and the center-to-center distance between successive lines is but 3.0 microns, leaving a guard band 1.5 microns wide.

Figure 4:
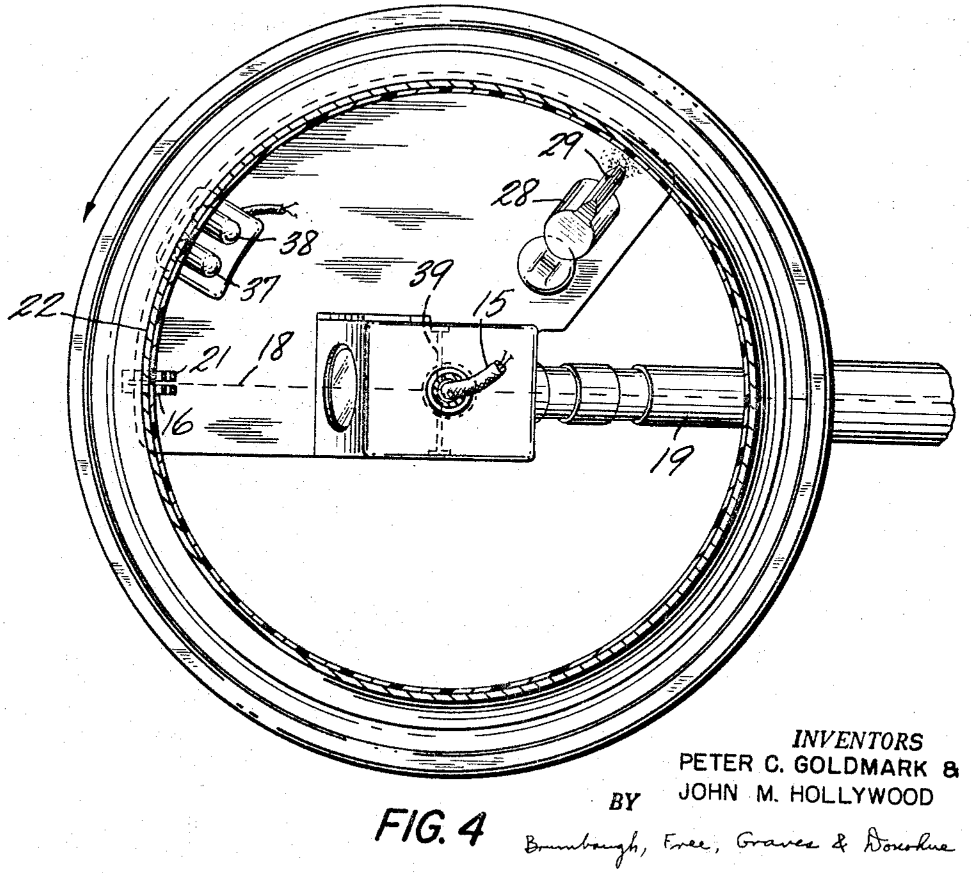
FIGURE 4 is a plan view of another exemplary embodiment of the tube of FIG. 1.

The system of FIG. 4 records by electron-bombardment-induced conductivity instead of secondary emission. A photocathode 37 is located in proximity to the target 22. The target 22 rotates in the direction indicated by the arrow (FIG. 4) about the axis 32 (FIG. 1). The photocathode 37 is substantially as long as the target 22 is wide, so that it extends across the target 22 from one side to the other.

During the recording cycle, a source of light 38 illuminates the photocathode 37, causing it uniformly to bombard the front portion 24 of the target 22 with electrons, thereby giving rise to secondary emission which leaves a uniform positive charge on the front portion 24. The gun 19 generates the electron beam 18 in the device of FIG. 4 just as in the device of FIG. 1, and, just as in the device of FIG. 1, the deflection coils 20 (shown in FIG. 1 but not in FIG. 4) cause the beam 18 to sweep back and forth in a plane at a scan rate of, say, 600 cycles per second, the beam being activated while it sweeps in one direction but blanked during the return sweep. The beam 18 generated by the device of FIG. 4 is modulated, however, not according to the method described in connection with FIG. 1, but by a conventional grid 39 connected to the lead 15 from the image orthicon and disposed near the cathode of the electron gun 19. When the beam 18 strikes the target 22, electron-bombardment-induced conductivity results and establishes a charge pattern on the target drum 22 which, as in the case of the embodiment previously described, corresponds to the visual information which it is desired to record.

Alternatively, when the image formed on the target 22 is of sufficient intensity to yield a strong readout signal without amplification by the powder 30, the tray 28 and the powder 30 may be omitted.

Readout is effected by the electron gun 19 as in the case where the recording is by secondary emission.

Figure 5:
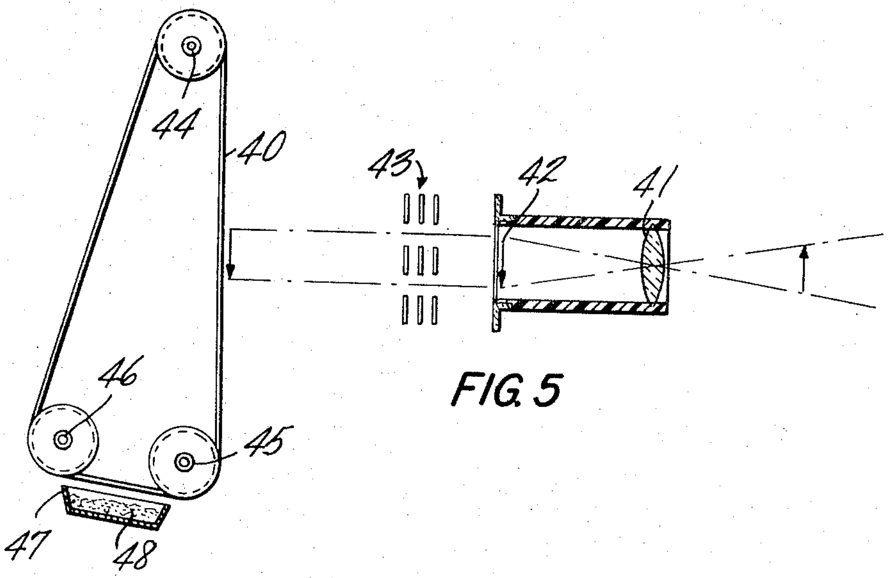
FIGURE 5 is a somewhat diagrammatic representation of another embodiment of the invention, in which electrostatic recording is effected without the aid of an electron gun or other scanning device.

FIG. 5 shows an embodiment of the invention in which no electron gun is necessary in order to form an electrostatic image on the target. The target may be a drum as in the previous embodiments, but it is here shown as a tape 40 adapted to form and store an electrostatic image in response to bombardment by charged particles. The formation of the image may be due to either the secondary-emission or the bombardment-induced-conductivity phenomenon described above. The tape may be an endless tape as shown or it may be a two-ended tape which is wound on two spools as in a conventional tape recorder.

An optical system 41 focuses a real optical image on a photocathode 42 which is adapted to release a number of electrons from any point thereof proportionate to the intensity of the light incident at that point. The electrons so released are accelerated in a conventional manner towards the tape 40 and pass through a mesh 43. The mesh 43 may be any other device such as slits adapted to multiply the electron current by secondary emission. The multiplied current passing through the mesh 43 impinges upon the tape 40, which moves, for example, in the direction indicated by the arrow, at a rate proportionate to the rate of motion, if any, of the object being photographed with respect to the recording apparatus. When the speed of the tape 40 is properly chosen in accordance with conventional techniques, it is possible to record an image of a moving object without blurring, even though no electron scanning beam or shutter is employed.

The tape 40 may be trained on a number of rolls 44, 45 and 46. The rolls 45 and 46 may define a plane above and closely adjacent and parallel to a tray 47 containing a powder 48 having a secondary emission yield different from that of the tape 40.

As the tape 40 runs along the plane defined by the rolls 45 and 46, the powder is attracted electrostatically to the various parts of the charged surface of the tape 40 in amounts proportionate to the respective densities of the charge of those parts.

Readout may be effected by an electron gun in the manner previously described.

In any of the embodiments of the invention, infrared and synchronizing signals may be recorded on the target at convenient locations, such as the end of each scanning line. In certain electronic reconnaissance systems, about 5% of the time interval between successive line starts is devoted to the latter types of signals, and an additional 5% of the time is required for flyback, leaving about 90% of the time for actual recording of visual information. Also, in any of the embodiments of the invention, a color subcarrier signal in, for example, the 3.6 mega-cycles-per-second range may be employed.

Thus, there is provided in accordance with the invention novel and effective means for high-density data storage. The apparatus described above possesses many advantages, including notably ruggedness, compactness and the ability to record about 70 times as much information per unit recording area as conventional magnetic recording apparatus.

The entire data-recording, storage and readout functions may be performed inside a vacuum tube which measures, in one embodiment, ten inches in diameter and six inches in thickness, exclusive of the protruding neck containing the electron gun. The weight of the tube is five to ten pounds, depending upon the materials used in its construction, and the total power consumption is of the order of 25 watts.

Many modifications of the embodiments described above are possible within the spirit and scope of the invention. For example, although rotation of the target drum has been described as one means of effecting proper spacing between successive scanning lines in the absence of a provision for vertical scan of the electron beam, it is obvious that rotation of the electron gun, the target being held stationary, is adaptable to achieve the same result. Further, other bombarding particles, such as alpha particles, can be substituted for the electrons in the beam 18. Accordingly, the invention is to be construed as including all of the modifications which fall within the scope of the appended claims.

We claim:

1. Data-recording apparatus, comprising a target adapted to form and store an electrostatic image in response to bombardment by charged particles, means mounted in spaced-apart relation to said target for effecting bombardment of said target by charged particles, whereby an electrostatic image is formed and stored on said target, and means for applying to said target in a pattern representative of said image a coating of a substance having a secondary emission yield different from that of said target.

2. Data-recording apparatus as defined in claim 1, in which said means for applying the coating to said target comprises means for bringing said substance and said target into proximity to each other, whereby said substance is electrostatically attracted to said target.

3. Data-recording apparatus as defined in claim 1, in which said coating comprises a powder, the secondary emission yields of said powder and said target having a ratio on the order of two-to-one.

4. Data-recording apparatus, comprising a target adapted to form an electron image in response to bombardment by electrons and to store said image, means mounted in spaced-apart relation to said target for effecting bombardment of said target by electrons, and means for applying to said target in a pattern representative of said image a coating of a substance having a secondary emission yield different from that of said target.

5. Data-recording apparatus, comprising a target having a surface adapted to form an electron image in response to bombardment by electrons and to store said image, said surface forming a curve having adjacent points in some plane equidistant from a given point in said plane, an electron gun mounted in said plane in spaced-apart relation to said surface for effecting bombardment of said surface by a beam of electrons, means for sweeping said beam in said plane and over said surface along said adjacent points, said beam having a center of deflection coincident with said given point, means for modulatnig said beam, a collector electrode mounted adjacent to said surface and between said surface and said electron gun, and a focusing electrode mounted adjacent to said collector electrode and between said collector electrode and said electron gun.

6. Data-recording apparatus as defined in claim 5, in which said collector electrode is elongated and flattened and intersects said plane at right angles to the direction of movement of said electrons and defines an aperture adapted to pass said electrons.

7. Data-recording apparatus as defined in claim 6, in which the width of said aperture in said collector electrode in a direction normal to said plane is greater than the diameter of the electron beam.

8. Data-recording apparatus as defined in claim 5, in which said focusing electrode is elongated and flattened and intersects said plane at right angles to the direction of movement of said electrons and defines a plurality of longitudinally-aligned apertures adapted to pass said electrons.

9. Data-recording apparatus as defined in claim 8, further comprising a plurality of longitudinally-aligned supports separating said apertures in said focusing electrode and intercepting said beam of electrons at intervals to blank said beam.

10. Data-recording apparatus, comprising a target having a surface adapted to form an electron image as a result of emission of electrons in response to bombardment by electrons and to store said image, said surface forming a curve having adjacent points in some plane equidistant from a given point in said plane, an electron gun mounted in said plane in spaced-apart relation to said surface for effecting bombardment of said surface by a beam of electrons, means for sweeping said beam in said plane and over said surface along said adjacent points, said beam having a center of deflection coincident with said given point, a collector electrode mounted adjacent to said surface and between said surface and said electron gun, a focusing electrode mounted adjacent to said collector electrode and between said collector electrode and said electron gun, means for supplying electrical impulses to said collector electrode, whereby said collector electrode is adapted to modulate said beam, and means for applying to said target in a pattern representative of said image a coating of a substance having a secondary emission yield different from that of said target.

11. Data-recording apparatus, comprising a target having an electrically-conductive rear portion and an electrically-insulating front portion adapted to form an electron image as a result of emission of electrons in response to bombardment by electrons and to store said image, said front portion forming a curve having adjacent points in some plane equidistant from a given point in said plane, an electron gun mounted in said plane in spaced-apart relation to said front portion for effecting bombardment of said front portion by a beam of electrons, means for sweeping said beam in said plane and over said front portion along said adjacent points, said beam having a center of deflection coincident with said given point, means for establishing relative motion between said target and said plane along a line which is tangent to said front portion at said plane and perpendicular to said plane, a collector electrode mounted adjacent to said front portion and between said front portion and said electron gun, a focusing electrode mounted adjacent to said collector electrode and between said collector electrode and said electron gun, means for supplying electrical impulses to said collector electrode, whereby said collector electrode is adapted to modulate said beam, and means for applying to said front portion in a pattern representative of said image a coating of a substance having a secondary emission yield different from that of said front portion.

12. Data-recording apparatus, comprising an annular target having an electrically-conductive back portion and an electrically-insulating front portion adapted to form an electron image as a result of emission of electrons in response to bombardment by electrons and to store said image, said front portion being symmetrical about an axis of symmetry, an electron gun mounted in spaced-apart relation to said front portion for effecting bombardment of said front portion by a beam of electrons, means for sweeping said beam in a beam-sweep plane and over said front portion, means for rotating said target about said axis, a collector electrode mounted adjacent to said front portion and between said front portion and said electron gun, a focusing electrode mounted adjacent to said collector electrode and between said collector electrode and said electron gun, means for supplying electrical impulses to said collector electrode, whereby said collector electrode is adapted to modulate said beam, and means for applying to said front portion in a pattern representative of said image a coating of a powder having a secondary emission yield different from that of said front portion.

13. Apparatus as defined in claim 12, in which said axis of symmetry lies in said beam-sweep plane.

14. Apparatus as defined in claim 12, in which said means for applying the coating to said front portion comprises a receptacle adapted to hold a supply of said powder in proximity to said front portion, whereby said powder is electrostatically attracted to said front portion.

15. Data-recording apparatus, comprising a target having an electrically-conductive back portion and an electrically-insulating front portion adapted to form an electron image as a result of conduction of charge from said front portion to said back portion in response to bombardment by electrons and to store said image, said front portion forming a curve having adjacent points in some plane equidistant from a given point in said plane, an electron gun mounted in said plane in spaced-apart relation to said front portion for effecting bombardment of said front portion by a beam of electrons, means for sweeping said beam in said plane and over said front portion along said adjacent points, said beam having a center of deflection coincident with said given point, means for establishing relative motion between said target and said plane along a line which is tangent to said front portion at said plane and perpendicular to said plane, a collector electrode mounted adjacent to said front portion and between said front portion and said electron gun, a focusing electrode mounted adjacent to said collector electrode and between said collector electrode and said electron gun, a modulating grid mounted adjacent to said electron gun, and means for supplying electrical impulses to said modulating grid.

16. Data-recording apparatus, comprising an annular target having an electrically-conductive back portion and an electrically-insulating front portion adapted to form an electron image as a result of conduction of charge from said front portion to said back portion in response to bombardment by electrons and to store said image, said front portion being symmetrical about an axis of symmetry, an electron gun mounted in spaced-apart relation to said front portion for effecting bombardment of said front portion by a beam of electrons, means for sweeping said beam in a beam-sweep plane and over said front portion, means for rotating said target about said axis, a collector electrode mounted adjacent to said front portion and between said front portion and said electron gun, a focusing electrode mounted adjacent to said collector electrode and between said collector electrode and said electron gun, a modulating grid mounted adjacent to said electron gun, and means for supplying electrical impulses to said modulating grid.

17. Apparatus as defined in claim 16, in which said axis of symmetry lies in said beam-sweep plane.

18. Apparatus as defined in claim 16, further comprising means for uniformly priming said front portion with a charge positive with respect to said back portion.

19. Apparatus as defined in claim 18, in which the means for priming said front portion includes a photocathode in proximity to said front portion and means for illuminating said photocathode.

20. Data-recording apparatus, comprising a movable target adapted to form and store an electrostatic image in response to bombardment by electrons, a photocathode mounted in spaced-apart relation to said target, an optical system adapted to form a real optical image on said photocathode, whereby electrons are released from said photocathode, means for accelerating said electrons to form an electron image on a said target, means interposed between said photocathode and said target adapted to emit secondary electrons in response to electron bombardment, means for moving said target at a speed proportionate to the speed of said optical image, and means for applying to said target in a pattern representative of said image a coating having a secondary emission yield different from that of said target.

21. Data-recording apparatus, comprising a movable target having an electrically-conductive back portion and an electrically-insulating front portion adapted to form an electron image as a result of conduction of charge from said front portion to said back portion in response to bombardment by electrons and to store said image, a photocathode mounted in spaced-apart relation to said target, an optical system adapted to form a real optical image on said photocathode, whereby electrons are released from said photocathode, means for accelerating said electrons to form an electron image on said target, means interposed between said photocathode and said target adapted to emit secondary electrons in response to electron bombardment, and means for moving said target at a speed proportionate to the speed of said optical image.

22. Apparatus as defined in claim 21, in which said means interposed between said optical system and said target is a mesh.

23. Apparatus as defined in claim 21, in which said means interposed between said optical system and said target is a grid having a plurality of slits therein.

24. Apparatus as defined in claim 21, in which said target is a tape.

25. Apparatus as defined in claim 21, in which said target is an annular drum.

26. Data-recording apparatus, comprising a target adapted to form and store an electrostatic image in response to bombardment by charged particles, means mounted in spaced-apart relation to said target for effecting bombardment of said target by charged particles, whereby an electrostatic image is formed and stored on said target, means for applying to said target in a pattern representative of said image a coating of a substance having a secondary emission yield different from that of said target, and readout means for reading out said electrostatic image.

References Cited

UNITED STATES PATENTS

| | | | |
|---|---|---|---|
| 2,689,314 | 9/1954 | Gunderson | 315—12 |
| 2,706,264 | 4/1955 | Anderson | 315—12 |
| 2,777,745 | 1/1957 | McNaney | 250—49.5 |
| 3,247,483 | 4/1966 | Wolfe et al. | 178—6.6 X |

ARTHUR GAUSS, *Primary Examiner.*

J. JORDAN, *Assistant Examiner.*

UNITED STATES PATENT OFFICE

CERTIFICATE OF CORRECTION

Patent No. 3,340,477 September 5, 1967

Peter C. Goldmark et al.

It is hereby certified that error appears in the above numbered patent requiring correction and that the said Letters Patent should read as corrected below.

Column 1, line 16, for "minimze" read -- minimize --; line 29, for "a" read -- as --; column 7, line 14, for "modulatnig" read -- modulating --; column 10, line 36, for "3,247,483" read -- 3,247,493 --; same line 36, for "Wolfe" read -- Wolf --.

Signed and sealed this 15th day of October 1968.

(SEAL)
Attest:

Edward M. Fletcher, Jr.
Attesting Officer

EDWARD J. BRENNER
Commissioner of Patents